United States Patent [19]

Newbould

[11] Patent Number: 5,039,901

[45] Date of Patent: Aug. 13, 1991

[54] ELECTRIC POWER SOURCE THROUGH STEAM TRANSITION

[76] Inventor: John M. Newbould, 206 Vassar Pl., Alexandria, Va. 22314

[21] Appl. No.: 544,109

[22] Filed: Jun. 22, 1990

[51] Int. Cl.[5] .............................................. H01L 41/08
[52] U.S. Cl. .................................... 310/339; 322/2 R
[58] Field of Search ......................... 310/339; 322/2 R

[56] References Cited

U.S. PATENT DOCUMENTS

| | | | |
|---|---|---|---|
| 2,522,389 | 9/1950 | Mason | 310/339 |
| 2,531,230 | 11/1950 | Mason | 310/339 |
| 3,166,684 | 4/1964 | Williams et al. | 310/339 |
| 3,665,226 | 5/1972 | Sinker et al. | 310/324 |
| 3,822,388 | 7/1974 | Martini et al. | 310/300 |
| 4,302,682 | 11/1981 | LaCoste | 290/1 R |
| 4,387,318 | 6/1983 | Kolm et al. | 310/330 |
| 4,442,372 | 4/1984 | Roberts | 310/339 |

Primary Examiner—Mark O. Budd
Assistant Examiner—Thomas M. Dougherty
Attorney, Agent, or Firm—Dennison, Meserole, Pollack & Scheiner

[57] ABSTRACT

A method and apparatus for generating electricity which capitalizes on the energy which is released by steam through sudden transition to a liquid state. Electric current is generated by piezoelectric elements which are attached to the walls of a vessel equipped with an outlet port and two inlet ports. Cold water enters the vessel at one of the inlet ports. Steam is introduced to the vessel at the other inlet port. The sudden change in phase from the vapor to the liquid state caused by the encounter of the steam with the interior of the vessel produces shock waves which mechanically charge the piezoelectric elements to produce an electric current.

12 Claims, 1 Drawing Sheet

ELECTRIC POWER SOURCE THROUGH STEAM TRANSITION

BACKGROUND OF THE INVENTION

1. Field of the Invention

The generation of electrical current with particular reference to improvements in means for providing useful application of the energy which normally erupts from steam during its condensation.

2. Description of the Prior Art

Conversion of various forms of energy into electrical current by capitalizing on the properties of certain dielectric crystals is commonly known. Typically, a difference of electrical potential is developed across such crystals as a result of applied mechanical stresses. One type of crystal which exemplifies such properties is the well-known piezoelectric element which becomes electrically charged when it is subjected to mechanical strain.

One piezoelectric apparatus for generating electricity is shown, for example, in U.S. Pat. No. 4,442,372. As disclosed in such patent, a liquid refrigerant in a chamber is heated by a furnace until it vaporizes. The vaporized refrigerant flows through a condensing chamber and returns as a liquid to the refrigerant chamber. Upon leaving the condensing chamber, the refrigerant has condensed and its pressure has dropped. The refrigerant chamber is divided into a series of compartments by a plurality of aperture plates which successively decrease in size from the inlet to the outlet end of the condensing chamber. Passing the refrigerant successively through the staggered holes causes pressure oscillation in the elastic gas. Spring-mounted piezoelectric elements within the chamber react to the pressure variations to produce electricity.

Another generator for producing electricity by relying on the action of piezoelectric elements is disclosed in U.S. Pat. No. 4,387,318. As disclosed in the patent, piezoelectric elements are mounted in a fluid stream and made to oscillate whereby the stresses in the crystal are converted to electric current. As mentioned in the patent, water may be used as one example of the source producing the mechanical inputs.

Still another form of prior art generator for producing electricity is found in U.S. Pat. No. 3,822,388. By relying on the impulses produced by a Stirling engine, the system therein disclosed uses a fluid coupling (mercury) which transmits the power of pressure pulses generated by the engine to a load means in the form of a piezoelectric generator. A fluid coupler between the engine and the load means is shown in the form of a mercury-filled tube with a flexible diaphragm at each end to separate the mercury from the working gas of the engine and the hydraulic fluid of the generator.

The structures of U.S. Pat. Nos. 3,665,226 and 2,522,389 are respectively other examples of relying on pressure variations caused by the flexing of a diaphragm and a series of high frequency series of explosions of a suitable fuel, both to excite a transducer such as a piezoelectric element.

Although satisfactory results can be considered to develop from application of the above-exemplary prior art systems, a need exists nonetheless for a relatively simple and reliable apparatus for capitalizing on steam as the source of the mechanical stimulus exerted upon a piezoelectric device.

SUMMARY OF THE INVENTION

Two containers regardless of their temperatures contain the same pressure if they are in communication without restriction. Hence, when a cold vessel is placed in communication with a hot cylinder filled with steam, the pressure of the vapor will almost immediately become as if the cylinder were cold, the steam rushing off to the colder vessel and condensing there. Thus, when steam enters a condenser and there meets a cooling medium, the pressure drops rapidly as the steam condenses, transfers heat, and falls into a liquid state. This effect has been capitalized upon in all modern steam expansion systems to improve efficiency. However, during the condensation an enormous amount of energy is lost during the change of state. The present invention recovers a substantial portion of that energy by transforming it into an electrical current. The present invention thereby comprises an arrangement of components which includes a chamber filled with continuously flowing water at a predetermined temperature. A plurality of piezoelectric elements or the like are deformed by the pressure impulses generated in the water as the steam changes state. An inlet port is directed to the chamber for allowing the input flow of steam, and a discharge port communicates with the vessel for drawing off the condensation products resulting from the sudden transition in phase from the vapor to the liquid state. The vessel according to the present invention is thus so constructed that a fluid at a certain temperature can be maintained in it and that by virtue of the piezoelectric elements quantities of electrical current are generated simultaneously with the appearance of water hammer caused by sudden condensation of the steam.

Accordingly, an object of the invention is to produce electrical current.

Another object of the invention is to produce electric current by the economic disposition of piezoelectric elements.

A further object of the invention is to convert the energy contained in steam to an electric current.

Yet another feature of the invention is to employ the walls of a chamber to contain mechanical impulses which exert a strain on piezoelectric elements mounted in the walls.

Still another feature characterizing the present invention is the construction of a low cost electrical generator whose application to existing condensation plants or any source of steam may economically be implemented.

Other objects of the invention will become apparent from the following detailed description of the embodiment of the present invention when taken in connection with the accompanying drawings.

BRIEF DESCRIPTION OF THE DRAWINGS

The same reference characters refer to the same elements throughout the several views of the drawings.

DESCRIPTION OF THE PREFERRED EMBODIMENT

Figure 1:
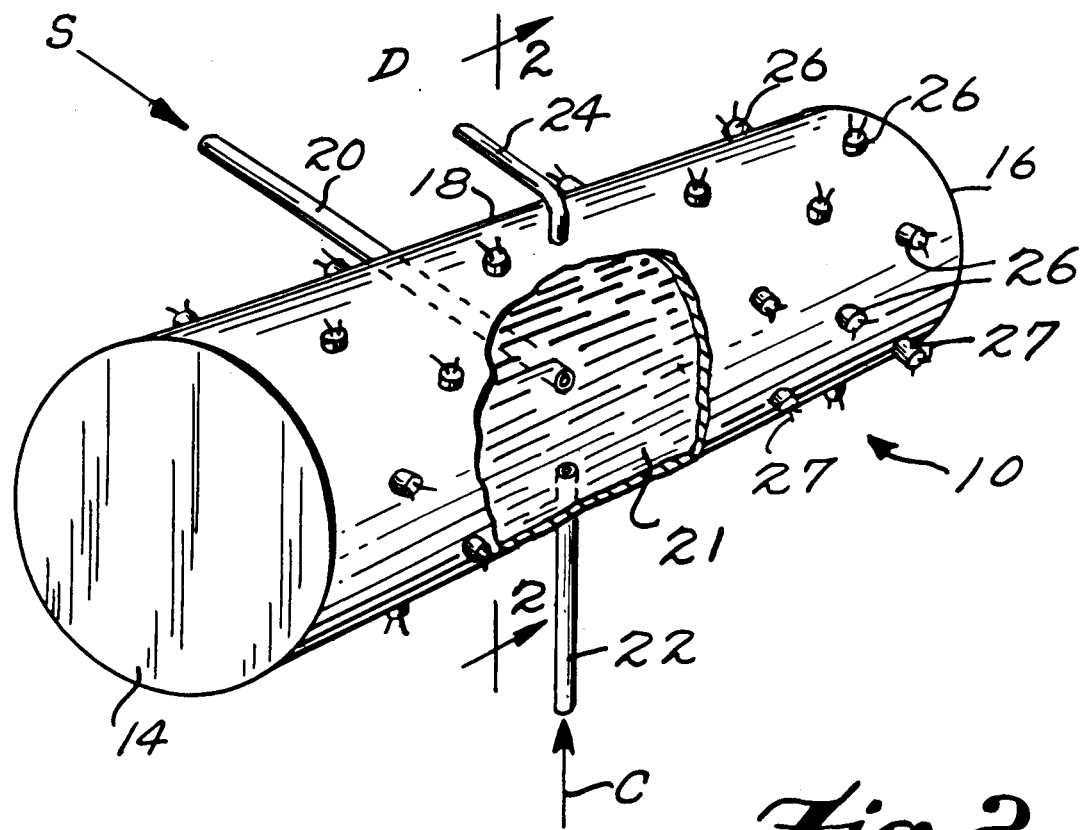
FIG. 1 is a view in perspective of the electricity generating apparatus of the invention and one specific embodiment thereof.

Referring to the drawings and particularly to FIG. 1, an electric current source generally designated by the reference numeral 10 and constructed in accordance with the present invention is shown as a chamber or vessel herein depicted in the form of a metal cylinder 12 having ends 14 and 16 and an intermediate body 18 of cylindrical cross section. Approximately at the median of the longitudinal axis of the cylinder 12 steam S from an appropriate conventional source is admitted to the interior of the cylinder 12 by means of an inlet connection or pipe 20 a portion of which interiorly connected to the cylinder will be understood to exhaust steam which bursts outwardly in all directions within the cylinder itself. Shown also within the cylinder 12 and designated by the reference numeral 21 is a layer or bed of cold water which is introduced to the cylinder by means of a second inlet port 22 characterized by having a conventional and convenient connection to a source C of water. Thus, as shown in FIG. 1, water entering through port 22 is maintained under continuous pressure at all times in order to fully occupy the cylinder 21. The benefits in the preferred embodiment of relying upon the non-compressibility of fluids immediately become evident during sudden transition of the steam S from the gaseous to the liquid phase.

As steam exhausting into cold water condenses rapidly, a considerable waste of heat develops and the condensation products must be evacuated from the condenser in order to allow for the continuous introduction of steam and its subsequent condensation. Accordingly, as shown in FIG. 1, the condensation products resulting in cylinder 12 from the collision of steam and water are drawn off by means of an outlet port 24 which is suitably connected with a conventional drainage D for the purpose of flowing to a low temperature receiver not shown.

Further as appears in FIG. 1, a source for the generation of electric power is shown as a plurality of transducers 26, which may be piezoelectric elements, arranged for close mechanical coupling with the water 21 and responsive to the mechanical strain experienced by the cylinder 12 caused by shock waves generated by condensing stream. The actual location of the piezoelectric elements with respect to the water 21 is unimportant it being required only that the housings which contain the transducers 26 be coupled to the shock waves by any suitable means such as, for example, by having a connection through a port, diaphragm, mechanical linkage or the like. To this end, and referring to the conversion system in FIG. 1, the transducers 26 are mounted on the walls of cylinder 12 in rigid mechanical connection with the intermediate cylindrical portion 18. Further as illustrated in the drawing, each piezoelectric element 26 is provided with a pair of leads 27 which may be connected in any convenient manner to devices (not shown) equipped to utilize the electrical current generated thereby.

As will be understood, the random nature of the installation of the piezoelectric elements 26 within the intermediate section 18 is given for purposes of illustration only. Various other arrangements for mounting the piezoelectric elements may readily be appreciated including the installation of additional piezoelectric elements if desired in the end walls of the cylinder 12. Moreover, it will be understood that the particular cylindrical configuration assigned to the condenser 12 is for purposes of exemplification only and it will be further understood that the condenser is not limited to the particular assembly shown but may be configured in alternative shapes which tolerate the pressure when a shock transition occurs.

Figure 2:
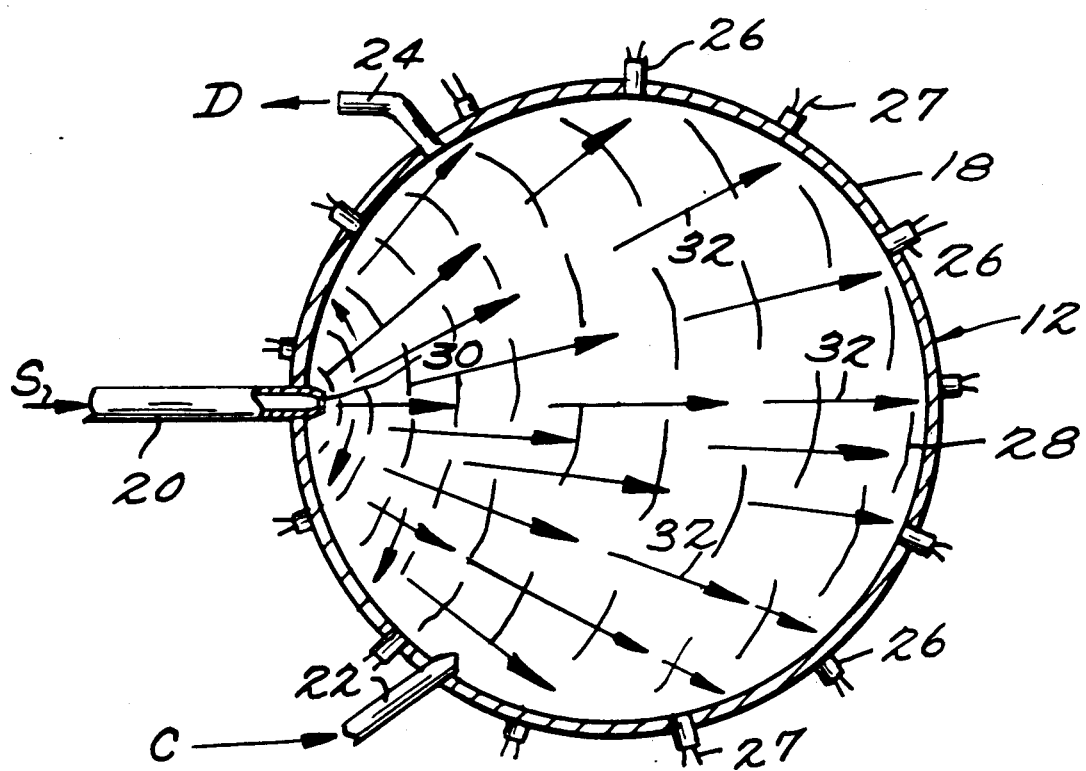
FIG. 2 is a greatly enlarged cross-sectional view taken approximately along the line 2—2 of FIG. 1.

In operation, the steam S from a suitable source enters the cylinder 12 and immediately condenses. The shock waves 28 (FIG. 2) generated by the instantaneous transition of the steam from its vaporous to liquid state are seen emanating from the input side 30 of the inlet pipe 20 in directions as shown by the arrows 32 represented in FIG. 2. The steam S entering the cylinder 12 occupies a volume of about 26.79 cubic feet per pound, but the water 21 within the same chamber occupies a volume of only about 0.0167 cubic feet per pound. As a result of the differential volume, the condensation of the steam by virtue of the pressure impulses 30 exerts a mechanical force contained within the skin or hull of the cylinder 12 which results in a mechanical strain on the piezoelectric elements and the consequent production of an electric current delivered to the pairs of leads 27. Stated differently, the differential pressure within the cylinder 12 is directly transformed to mechanical energy dynamically coupled to exert on the piezoelectric elements a force sufficient to charge the crystals into producing an electric current. By hydraulically coupling the pressure waves directly to the piezoelectric elements, the apparatus embodying the invention produces an extremely high efficiency during the exchange and resulting electric current production.

In the foregoing description it will be apparent that the invention provides a novel and extremely advantageous electric current generator dependent upon steam power. The spontaneous transition of the steam S within the cylinder produces onmidirectional pressure impulses which act virtually upon every square inch of the interior surface of the cylinder.

The invention, of course, is not limited to the embodiment described above and it will be apparent to those skilled in the art that various changes and modifications may be made without departing from the spirit of the invention or the scope of the appended claims.

I claim:
1. A voltage generator comprising:
    a vessel having two inlet ports and an outlet port;
    means for introducing cold water to said vessel through one of said inlet ports;
    means for introducing steam to said vessel through the other of said inlet ports;
    stress-responsive means actuated by mechanical forces caused by condensation of said steam for producing an electrical current; and wherein said vessel is so constructed that shock waves acting on its walls during condensation are converted to an electrical current.
2. A voltage generator in accordance with claim 1 in which said water is at ambient temperature.
3. A voltage generator in accordance with claim 1 in which condensate leaves said vessel through said outlet port.
4. A voltage generator in accordance with claim 1 wherein said stress-responsive means are piezoelectric elements.
5. A system for conversion of steam to electric power comprising:
    a vessel in communication with independent sources of cold water and steam; means coupled to said vessel for generating an electric current as steam condenses; and wherein said vessel is so constructed that said electrical current results from shock waves contained within the walls of said vessel.

6. A system in accordance with claim 5 in which said water is at ambient temperature.

7. A system in accordance with claim 5 in which heated water is drawn from said vessel.

8. A system according to claim 5 wherein said generating means are piezoelectric elements.

9. A generator of electric current comprising:
a metal vessel containing cold water;
a source of steam infiltrating said vessel;
means rigidly attached to said vessel and responsive to water hammer for producing a voltage;
and means for exhausting said vessel of condensate.

10. A generator in accordance with claim 9 wherein said water is at ambient temperature.

11. A generator in accordance with claim 9 wherein said voltage producing means are a plurality of mechanically stressable elements.

12. A generator in accordance with claim 11 wherein said stressable elements are piezoelectric crystals.

* * * * *